W. F. H. BRAUN.
AUTOMATIC RELEASING AND REENGAGING DRIVE.
APPLICATION FILED DEC. 5, 1912.
1,111,990.
Patented Sept. 29, 1914.
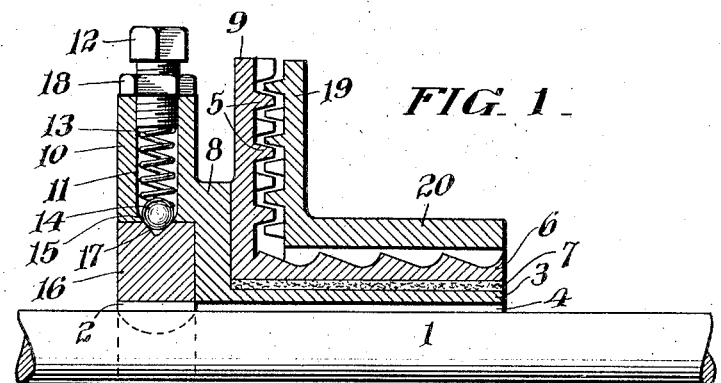
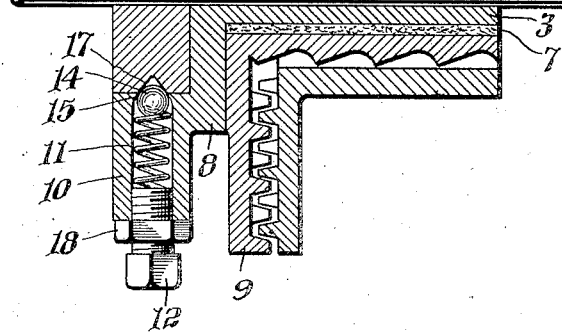
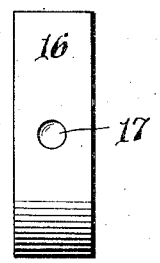
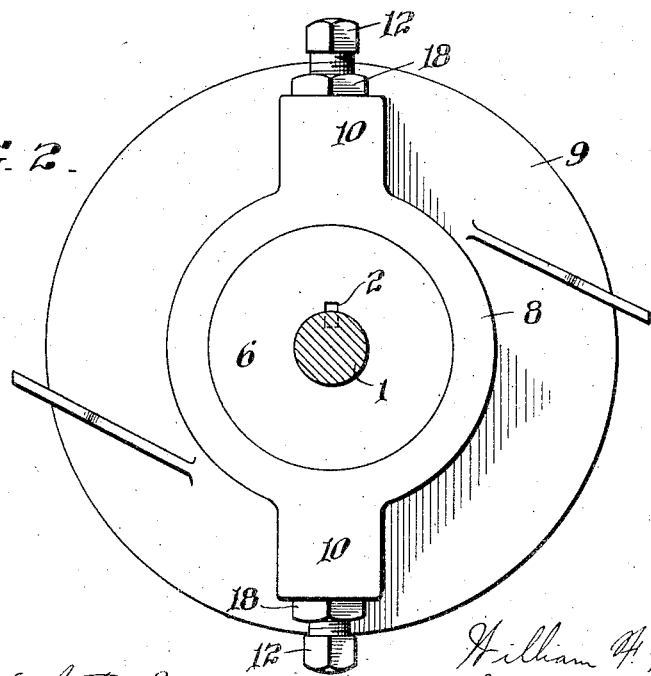
WITNESSES
Daniel Webster, Jr.
William Conway
INVENTOR
William F. H. Braun
Cornelius D. Ehret
BY
his ATTORNEY ptinstants
UNITED STATES PATENT OFFICE.

WILLIAM F. H. BRAUN, OF PHILADELPHIA, PENNSYLVANIA, ASSIGNOR TO COLES MANUFACTURING COMPANY, OF PHILADELPHIA, PENNSYLVANIA, A CORPORATION OF PENNSYLVANIA.

AUTOMATIC RELEASING AND REENGAGING DRIVE.

1,111,990.  Specification of Letters Patent.  Patented Sept. 29, 1914.

Application filed December 5, 1912. Serial No. 735,058.

*To all whom it may concern:*

Be it known that I, WILLIAM F. H. BRAUN, a citizen of the United States, residing in the city of Philadelphia, county of Philadelphia, and State of Pennsylvania, have invented certain new and useful Improvements in Automatic Releasing and Reengaging Drives, of which the following is a specification.

My invention has for its object the provision of means for automatically releasing a driving member, such as a grinding member of a coffee or other mill, from its driving member, when such driven member offers too great a resistance, as in the case where too large an object or an object incapable of being ground lodges between the grinders; and for automatically reengaging the driven member with the driving member.

My invention resides in the features hereinafter described and claimed.

For an illustration of one of the forms my invention may take reference is to be had to the accompanying drawing, in which:

Figure 1 is a longitudinal sectional view, parts in elevation, through mechanism embodying my invention. Fig. 2 is an end elevational view of the same. Fig. 3 is a side elevational view of the driving member.

A shaft 1 carries a key 2 over which may be passed from left to right the cylindrical hub or extension 3 having the longitudinal groove 4 large enough to pass freely over the key 2. A rotary grinding member 9 having the teeth 5 has a hub 6 which is mounted upon the hub 3. Babbitt or other metal 7 intervening between the hubs 3 and 6. The grinding member 9 is positively driven by driven member 8 through the Babbitt metal 7.

The driven member 8 is provided with one or more lugs 10 having extending therethrough in a substantially radial direction a hole 11. Into the hole 11 is threaded a bolt or screw 12 and beneath the bolt or screw 12 is disposed a spring 13 compressed against a ball or round nosed plunger 14 which in the case shown is of a diameter too large to pass through the lower constricted opening 15 at the inner end of the hole 11. The member 8 is countersunk to receive the driving member 16 held to the shaft 1 by the key 2 and having depressions 17 receiving balls or plungers 14 and extending a relatively short distance circumferentially of member 16. A lock nut 18 is preferably provided for each nut or screw 12.

The stationary grinding member, or member coöperating with the driven cutting member 9 is shown at 19, the same having a hollow hub 20 receiving the hub 6.

The operation is as follows: The shaft 1 is driven by any suitable means such as a belt or motor and carries around with it positively the driving member 16. The engagement of the driving member 16 with the balls or members 14 transmits the rotary effort to the driven member 8 which accordingly drives the member 9. If too large resistance should be offered to the rotation of the driven member 8, as by foreign bodies lodging between the members 9 and 19, the increased force exerted by driven member 16 upon members 14 will cause the members 14 to ride out of their depressions 17 in opposition to their springs 13 in which case the member 16 will continue rotation without driving member 8, the members 14 in such case simply riding upon the outer cylindrical surface of the member 16. But the members 14 will immediately reëngage in depressions 17 when such depressions are again brought around in front of the members 14. And if the resistance is no longer too great the member 8 will again be driven by the member 16. Normally the springs 13 are set under considerable compression so as to cause the member 8 to be driven by balls 14 against a considerable normal resistance. Furthermore, if it is desired to separate the member 8 from the member 16 the screws or bolts 12 may be loosened, thereby releasing compression of springs 13 and allowing the members to easily recede to move the member 16 toward the left and out of the counter-sink in the member 8. Or such separation of members 16 and 8 may be accomplished without loosening the screws 12 provided sufficient pressure longitudinally of the shaft 1 be exerted in which case the members 14 will yield in opposition to springs 13 as in the case of yielding during rotary movement.

It will be noted that it is possible, by the construction described, to obtain the automatic release and reëngagement of the driving and driven members for rotation in either direction.

While I have here shown the members 14 as in the form of balls, they may take any other suitable form so long as there is a curved or inclined surface of engagement between them and the member 16 so as to be capable of riding up on the surface of the member 16.

It is to be understood also that the members 9, 8 and 16 may be stationary and the member 19 be the rotary member.

It is to be understood also that the depressions 17 may be in the member 8 and the members 14 be carried by the member 16.

What I claim is:

1. The combination with a driving member having a cylindrical periphery and having a circumferentially short depression in said periphery, of a driven member having a bore, said bore having an aperture of less diameter next to the periphery of said driving member, and a resiliently pressed ball too large to pass through said aperture projecting through said aperture normally engaging in said depression.

2. The combination of a shaft, a rotary member keyed thereon, a second member rotatable upon said shaft and upon the first-mentioned member, said first-mentioned member having sockets formed therein, said second-mentioned member having elongated openings formed therein and restricted at their lower ends, balls movable in said openings, said balls being of a less diameter than the diameter of the openings, and being of a larger diameter than the diameters of the restricted ends of said openings, whereby they will be limited in their movement toward the sockets in the first-mentioned rotatable member, adjustable plugs for the openings in the second-mentioned rotatable member, and springs disposed within said openings and contacting with the adjustable plugs and balls.

In testimony whereof I have hereunto affixed my signature in the presence of the two subscribing witnesses.

WILLIAM F. H. BRAUN.

Witnesses:
ELEANOR T. McCALL,
NELLIE EVANS.